United States Patent [19]

Simonoff

[11] Patent Number: 4,943,929

[45] Date of Patent: Jul. 24, 1990

[54] CHEMICAL AGENT MONITOR AND CONTROL INTERFACE

[75] Inventor: Adam J. Simonoff, Dahlgren, Va.

[73] Assignee: The United States of America as represented by the Secretary of the Navy, Washington, D.C.

[21] Appl. No.: 267,152

[22] Filed: Nov. 4, 1988

[51] Int. Cl.$^5$ .......................... G06F 15/46; G01N 31/00

[52] U.S. Cl. .......................... 364/496; 340/632

[58] Field of Search .............. 364/200, 900, 496, 497, 364/514, 500; 73/27 R, 40, 23.1, 23, 24; 250/336.1, 282, 461.1, 461.2; 340/632, 693; 455/608, 610, 612

[56] References Cited

U.S. PATENT DOCUMENTS

| | | | |
|---|---|---|---|
| H431 | 2/1988 | Miller | 250/336.1 |
| 4,047,159 | 9/1977 | Boudry | 364/200 |
| 4,388,732 | 6/1983 | Hansel | 455/612 |
| 4,485,439 | 11/1984 | Rothstein | 364/200 |
| 4,577,109 | 3/1986 | Hirschfeld | 250/461.1 |
| 4,578,586 | 3/1986 | Preston | 340/693 |
| 4,638,443 | 1/1987 | Kaneyasu et al. | 364/497 |
| 4,761,832 | 8/1988 | Gade et al. | 455/610 |
| 4,783,851 | 11/1988 | Inou et al. | 455/612 |
| 4,825,113 | 4/1989 | Sato et al. | 455/612 |
| 4,829,596 | 5/1989 | Barina | 455/610 |

*Primary Examiner*—Kevin J. Teska
*Attorney, Agent, or Firm*—John D. Lewis; Kenneth E. Walden

[57] ABSTRACT

A chemical monitor interface is generally comprised of three identical circuit boards each linked together through fiber optics. One of the circuit boards is electrically connected to a Chemical Agent Monitor (CAM), an off-the-shelf product, while another circuit board relays control information to the first connected to the CAM. A third circuit board relays only visual status to an observer by using a plasma display, while the first two boards can also control the CAM as well as display status. The interface allows the CAM to run without human intervention, thus allowing the U.S. Naval Fleet, and other U.S. military field units, to meet a need for remotely detecting life-threatening chemical attacks without harm to personnel. The chemical detector is able to purge itself of chemical agents and is immune to shock, vibration and radiations such as EMI.

5 Claims, 7 Drawing Sheets

*DETECTOR ONLY

CHEMICAL AGENT MONITOR AND CONTROL INTERFACE

The U.S. Government has rights in the invention described herein. This invention may be manufactured and used by or for the Government for governmental purposes without the payment of any royalty thereon.

BACKGROUND OF THE INVENTION

This invention relates to the field of detecting chemical agents. The invention, in particular, relates to a device that enables a chemical agent monitor which records and quantifies a chemical agent in the environment to tranmit the data to a remote display. It is an interface until that is capable of processing the data from conventional ion mobility spectrometry chemical detection units and converting and transmitting this data in a form useable by a conventional remote readout plasma panel or other type conventional display. The interface has three modes and allows many and varied systems to be assembled from existing components in the United States and North Atlantic Treaty Organization's (NATO's) arsenals.

A hand-held Chemical Agent Monitor (CAM) field unit developed by Graseby Dynamics Ltd. of Great Britain was chosen for the point detector as the units are ubiquitous in both our Naval fleet and the fleets of our allies. Some minor modification of these units is hereinbelow disclosed. The modifications provide for remote control and remote sensing of airborne chemical agents by providing one or a plurality of plasma displays and controls through a fiber optic link.

The hand-held CAM device, based on an ion mobility spectroscopy (IMS) cell, samples the air of chemical agents and informs personnel of dangerous contamination by displaying one to eight bars on its liquid Crystal Display (LCD) and outputs a serial data burst encoding the agent detected and its concentration. The CAM chosen for modification and incorporation into this disclosed system is one of several of this type available commerically, and it is within the scope of this disclosure to use any CAM outputting a serial data burst encoding the agent detected and its concentration. The CAM is neither illustrated in detail nor claimed as part of this invention. The CAM is available to those having the proper permits by the North Atlantic Treaty Organization.

The U.S. Naval Fleet and other U.S. military field units have a need for remotely detecting life-threatening chemical attacks without harm to personnel. The chemical detector must be able to purge itself of chemical agents and be immune to shock, vibration and radiations such as EMI.

Therefore, one object of this invention is to provide a microprocessor based interface which will attach remote controls, fiber optics and plasma displays to the held-held chemical detector unit to provide a means of placing the CAM in service at a remotely fixed point allowing it to monitor for chemical agents without harm to personnel.

Another object of this disclosure is to teach an interface that will provide for remote warning of a pending chemical attack.

Another object of this invention is to allow a CAM to be permanently installed aboard a ship.

Still another object of this invention is to allow a CAM to be permanently mounted onto a tank.

Another object of the instant invention will also allow a plurality of CAMs to monitor remote sites in the field while personnel can safely read the chemical detector display data at a central reporting station.

Yet another object of the instant invention will also allow a plurality of CAMs to monitor remote sites in the field while personnel can safely control the chemical detector from a central control station.

Another object of this invention is to teach a chemical alarm system easily adaptable to a shipboard power bus.

Still another object of this invention is to teach a chemical alarm system easily adaptable to a field vehicle power bus.

Another object of this invention is to teach a chemical alarm system easily adaptable to a field battery pack.

Another object of this invention is to teach a chemical alarm system constructed from off-the-shelf components available both commerically and through the military supply system.

Another object of the instant invention is to teach an interface and system for remote warning of changes in the chemical environment which uses CAMs currently available throughout the North Atlantic Treaty Organization.

Additional objects, advantages and novel features of the invention will become apparent to those skilled in the art upon examination of the following description or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purpose of the present invention as embodied and broadly described herein, the present invention comprises an interface to link chemical agent monitors and remote monitoring displays.

One embodiment of a system using the chemical agent monitor interface of the present invention is a system built for testing aboard one of our Navy's warships. In this application three chemical detecting units were located at exterior points on the ship where they could monitor the outside environment.

These chemical detection units used in this embodiment are off-the-shelf hand-held Chemical Agent Monitors (CAM), developed by Graseby Dynamics Ltd. of Great Britain. They were slightly modified to allow remote purging and control. These units sample vapors and measure the relative concentrations of the chemical agent detected by using ion mobility spectrometry (IMS) cells. The detectors then display, on their liquid crystal displays (LCD), a series of one to eight bars relative to the concentration being detected, the active mode of operation, battery status, and the state of its reactant ion peak (RIP) reference signal. In addition to its LCD readout, the devices output encoded data on a TTL compatible 300 Baud serial ink indicating the same information as found on its LCD readout plus a four-digit dosage value and an agent identification code. They have a power on control switch and a mode switch which allows the device to detect nerve agents in G mode, or blister agents in H mode. The system constructed to test employed two CAMs and two interface units at each detection site to monitor both nerve and blister concentrations simultaneously.

A CAM chemical detection unit and its associated control interface are electrically connected to each other and mounted in such a manner that the chemical detection unit can sample the ambient air.

The interface reads the information from the detector via the TTL compatible 300 Baud serial data link located on the rear connector of the detection unit. The interface then translates this data to an easy to read off-the-shelf display.

The interface requires a solenoid valve be added to the detector which replaces the CAM filter nose cap when the CAM is used as a hand-held device. This allows the detector to sample ambient air or draw clean air through its IMS cell via a carbon filter, known as "purging". The purging action is automatically initiated by the interface when it detects six or more concentration bars or a low RIP reference signal. Personnel may, also, control the solenoid valve manually via a control switch. Normally, if while personnel are utilizing a held-held CAM and a high dosage of chemical agent is detected, the CAM operator must, manually, replace the filter nose cap over the CAM intake orifice in order for the CAM to purge itself. The purging modifications disclosed but not claimed allow remote and automatic purging.

The control interface is fiber optically linked to an identical interface which can be several hundred feet away. The interface automatically configures itself to read the control panel switches and directs the control interface, electrically attached to the chemical detector, to operate the detector unit to monitor for blister or nerve agents if a single detection system is constructed and to sample or purge the chemical detection IMS cell. The system status on the system constructed to test the interface was displayed on a red 40 column by 6 line off-the-shelf plasma display. The status includes audio-visual warning of the detected agent, the relative concentration of the agent, blister or nerve mode, sampling or purging the detection cell, power failure at the detection unit, power failure of the control panel, disruption of the fiber optic link, and whether control of the detector is from a remote site or locally at the interface connected to the chemical detector.

A remote site unit may be located at a remote reporting station. It consists of the identical interface as the first two installations and is fiber optically linked to either of the first two sites to echo the display at the remote control interface.

Additionally, any of the above interface installations may be wired to any existing alarm annunciation panel.

Interface controls are comprised of the following:

Mode Control—Personnel may select G mode for sensing nerve agent or H mode for sensing blister agent. (The detector must be modified to accept this signal by replacing the detector's mode switch with the interface's mode select relays.) The system to be tested uses two CAMs and two interface units at each point detector site to avoid mode switching, but the disclosed interface allows single installation.

Purge Control—Personnel may activate the purge valve to draw air through a carbon filter or allow the detector to sample air. When sampling air, the interface will automatically activate the purge valve when the IMS cell becomes saturated with agent at an indication of six or more concentration bars. (However, this six-bar threshold is arbitrary and can be modified in the interface software.)

Dim Control—Personnel may adjust the intensity of the plasma display. (The selection of a plasma display is arbitrary. The interface may be programmed to use any RS232 Compatible display.)

Alarm Control—Personnel may silence the local audible alarm. An indication of two or more concentration bars defines an alarm condition. (However, this two-bar threshold is arbitrary and can be modified in the interface software.)

Local Override—Personnel may set the interface controls at the detector and bypass the control signals arriving across the filter optic link. The system may be controlled either at the chemical detector or from a remote fiber optic link to another identical interface. The override control also enables a detector electrically connected to an interface to run stand alone without a fiber optic link.

The interface is designed to be installed in three different sites and to assume three different roles as follows:

1. Remote Display and Control
2. Local Display and Control
3. Remote Display

The microprocessor based interface is programmed to configure itself for the proper role by reading the motherboard in which it is inserted, thereby allowing quick field replacement of a failed unit by personnel with little or no knowledge of the interface printed circuit card. Local or Remote Control is switch selectable by personnel at the chemical detector installation.

The interface is best described by discussing how it operates in each of its three aforementioned roles:

ROLE 1

Remote Display and Control

In one embodiment of the instant invention, this role may be assumed by an interface installed in Damage Control Central (DCC) aboard a Naval vessel.

On power up, the plasma display will display the banner message indicating the software version. The software version is used to indicate if an interface has the latest software release. The display will also show the message "STANDBY" as it awaits display data from the interface electrically connected to the chemical detection unit.

The interface will then begin transmitting the Control panel switch settings and power status to the interface at the detection site through a fiber optic link.

Next, the interface polls its dim control switch to determine if it should dim its plasma display. If the switch is activated, the interface will ignore the fiber optic link, go off line, and the display will dim and then brighten for as long as the switch is activated by personnel.

The interface then samples the fiber optic link for an eight-bit synchronization character which is used for synchronizing the plasma display information with the interface at the chemical detector site. When the sync character is detected, the ROLE 1 interface displays all the characters arriving across the fiber optic link. If an alarm condition arises, then the ROLE 1 interface is issued an eight-bit code to turn on its alarm. If the alarm condition does not exist, then the interface receives an eight-bit code to disable the alarm.

After a character is displayed, the interface remote control starts the sequence of events again by sending a new remote control byte to the chemical detector site interface.

Built-in confidence checks of the interface indicate proper system operation via a flashing asterisk in the upper left-hand corner of the display. If the asterisk ceases to flash in ROLE 1 and the dim switch is off, then either the interface at the detector or the detector itself has malfunctioned or the fiber optic link from the detector site to DCC has been damaged. If the asterisk flashes at a 50% duty cycle, then serial data is not arriving from the detector to its host interface. This occurs when the chemical detector enters its own "WAIT" state.

ROLE 2

Local Display and Control

This role is normally assumed by an interface electrically connected to the chemical detector. This role functions as the master of the complete system of site installations. An interface in this role can run stand alone in local control mode with a chemical detection unit or can communicate with remote installations.

On power up, the plasma display will show a banner message indicating the software version. The version is used to indicate if an interface has the latest software release. The information sent to the attached plasma display is simultaneously sent across the fiber optic link, except for display dimming codes which are limited only to the attached host plasma display. The interface will power the chemical detector and set the purge valve to purge regardless of the control switch settings until the chemical detector's "SELF-TEST" is complete.

After the detector's self-test has completed, the interface will then read the chemical detector's serial data link and determine if the purge Valve should be set and if the Mode Switch should be inhibited. If the chemical monitor detects a chemical agent and six concentration bars are indicated, then the purge Valve will be set to draw air samples through a carbon filter to remove contaminates entering the detector's IMS cell. When one or no bars are indicated by the detector, the purge Valve will be set to Sample again if the control panel purge switch is OFF. Additionally, the interface can be switched to PURGE indefinitely for calibration purposes. The PURGE and MODE switches are inhibited if two or more bars are displayed or a low RIP is indicated.

The plasma display then exhibits the required information. The detector may interrupt the interface to send a new data burst at any time while the interface attempts to display information to personnel. If an alarm condition exists, then "ALERT DETECTED AGENT:" appears on the display followed by a two-letter agent ID and a four-digit DOSE value. The agent ID codes may be either GA, GB, GD, VX, HS or HN. The warning bars are displayed on the next line to provide visual representation of the relative agent concentration. The bars appear as [n], where n=1 to 8. The interface will activate an audible alarm, energize a relay switch can tie into any existing alarm system and broadcast an alarm-on signal to other interfaces on the fiber optic link. An alarm condition is programmed into the interface as two or more concentration bars. If no alarm condition exists, then alarms are de-energized and two blank lines appear on the display where the warning message would otherwise appear.

The interface then displays, on the following line, the position of the purge Valve to indicate SAMPLE or PURGE followed by one of the following jumper selectable messages:

"MONITORED ZONE"
"PORT SIDE-AFT"
"PORT SIDE-FORWARD"
"STARBOARD SIDE-AFT"
"STARBOARD SIDE-FORWARD"

in order to indicate the location from which the detector is drawing its air samples. This serves to alert personnel as to the source of the detected chemical agent.

The interface then indicates the detector's mode of operation from the detector's serial data link. The display will indicate "G MODE: NERVE" or "H MODE: BLISTER", corresponding to the type of chemical agent being screened for in each sample. This is set by the mode switch. However, the mode switch will be inhibited until the detector completes its "SELF-TEST" in H mode or whenever there is a chemical alarm condition or low RIP signal. In the system considered to be the best mode to practice the interface, two CAMs and interfaces are used at each detection site to allow simultaneous monitoring.

On the next line, the interface will indicate the system status. The interface at the detector then reads its Chemical Monitor Control Panel's Local Override switch to determine the source of the control settings. If the controls are "Local", then the display shows "CONTROLS AT THE DETECTOR". If the controls are "Remote", then the display indicates "CONTROLS ON AC" for power okay, "CONTROLS ON DC" for battery backup, or "CONTROLS OFF" when the detector is missing the remote control byte from the fiber optically linked remote control interface. If the remote controls go off line, then the ROLE 2 interface will maintain the last mode selection and sample for agent regardless of the last PURGE switch setting. This is done to guarantee that if the control link is broken, the detector will still be able to alert personnel, at the detector, of chemical hazards. The interface connected to the detector indicates its own power status with the message "DETECTOR ON AC" for power okay, or "DETECTOR ON DC" for battery backup. Finally, the interface checks its own Dim switch and alters the brightness for as long as the switch is activated. Normal operations will continue while the plasma display's intensity changes. The interface repeats the sequence of events by reading the control switch settings.

Built-in confidence checks of the interface indicate proper system operation via a flashing asterisk in the upper left-hand corner of the display. If the asterisk ceases to flash in ROLE 2, then the interface at the detector or the detector itself has malfunctioned. If the asterisk flashes at a 50% duty cycle, then data is not arriving from the detector. This occurs when the detector enters its "WAIT" state.

ROLE 3

Remote Display

In one embodiment of the instant invention, ROLE 3 is normally assumed by an interface installed in the Combat Information Center (CIC) or the Bridge aboard a combatant Naval vessel. This role functions exactly like ROLE 1 except that there are no Mode Purge controls. This unit's role only functions to receive data from the fiber optic link and display it on its plasma display. No information is transmitted on the link from this Remote Site Unit (RSU), therefore any number of these units may be daisy-chained at installations throughout a ship and will be undetected by the other interface cards at any other site. The same confidence checks of ROLE 1 apply to ROLE 3 .

BRIEF DESCRIPTION OF THE DRAWINGS the accompanying drawings, which are incorporated in and form part of the specification illustrate an embodiment of the present invention and, together with the description, serve to explain the principles of the invention.

FIGS. 3,4,5, and 6 are sections of the schematic of the interface.

Figure 7:
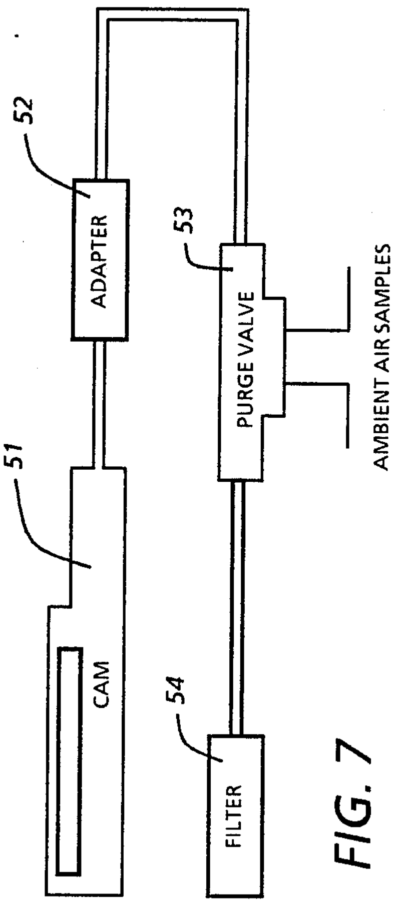

FIG. 7 is a block diagram of the modifications necessary to allow the interface of the present invention to automatically and/or remotely control the purge function of an associated military standard CAM.

Figure 8:
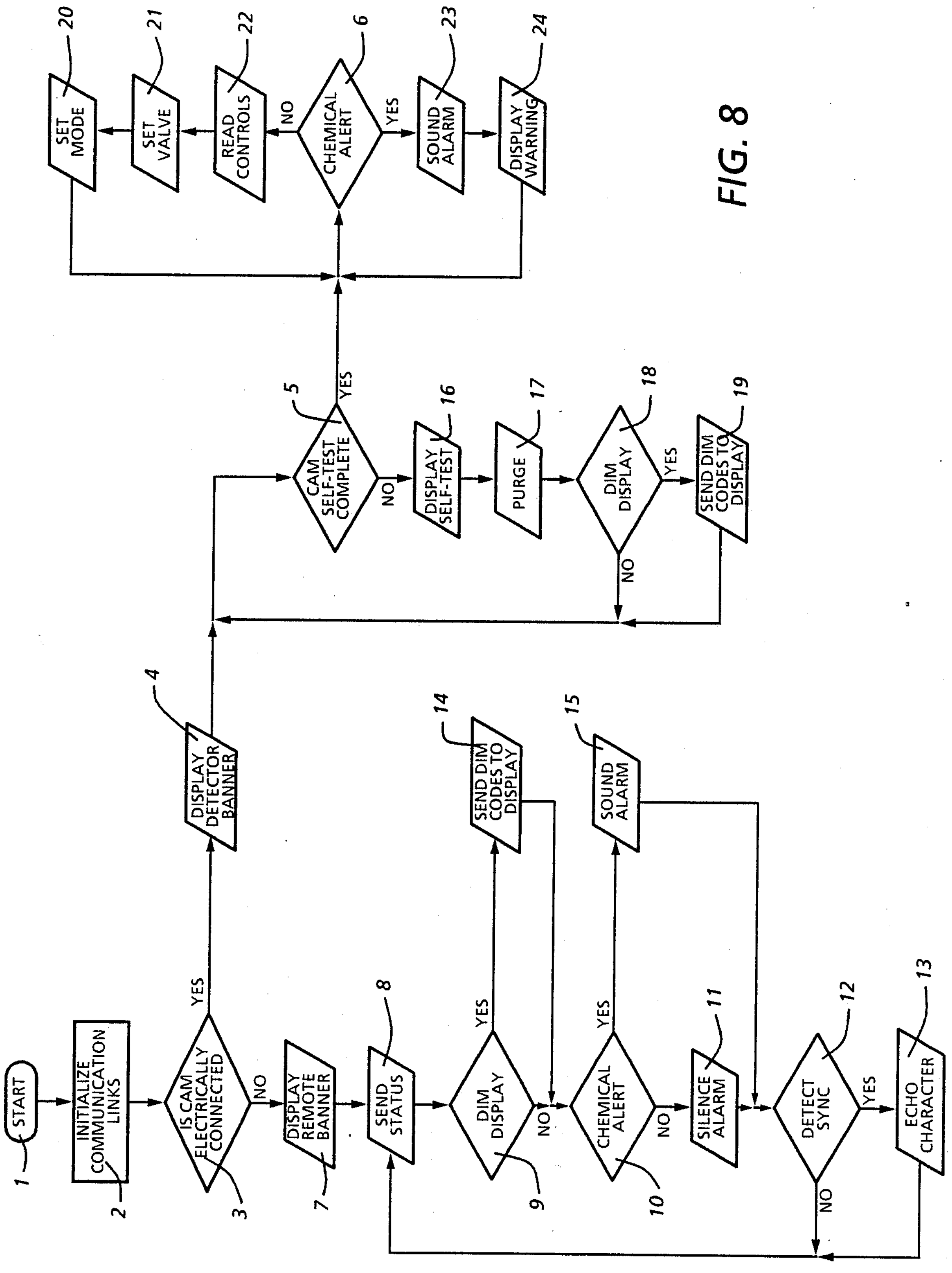

FIG. 8 is a software flow chart of the main program of the interface of FIGS. 3 through 6.

Figure 9:
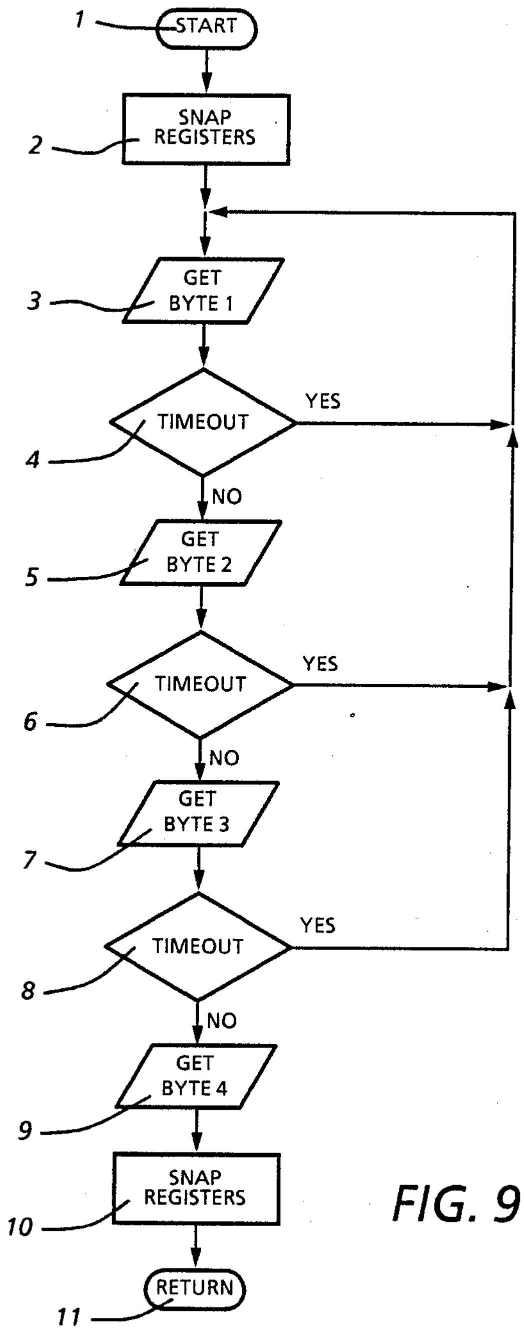

FIG. 9 is a software flow chart of the interrupt service routine of the interface of FIGS. 3 through 6.

DETAILED DESCRIPTION OF THE INVENTION

Figure 1:
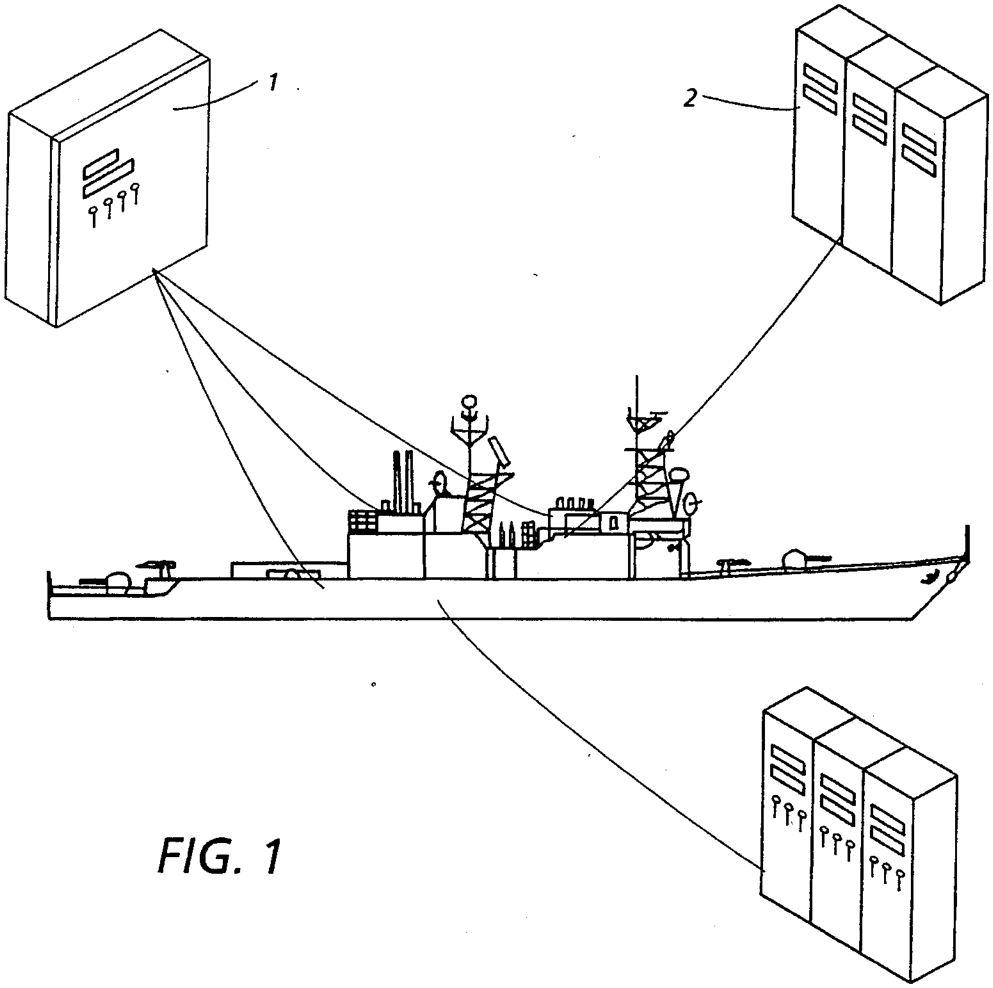
FIG. 1 is a pictorial representation of a warship having a chemical monitoring system employing the interfaces of the present invention.

Turning now to FIG. 1, the placement of various units forming a chemical detection system employing the interface of the present invention is disclosed. Therein the numeral 1 represents units comprised of two off-the-shelf chemical agent monitors of the ion mobility spectroscopy type which are hardwired electrically to two interfaces of the present invention configured in the (ROLE 2) detector mode hereinabove described. One of the CAM/interface pairs for blister agents (H mode) and the other (G mode) for nerve gas. In FIG. 1 three detector/interface units are shown strategically placed about the ship.

Numeral 2 represents a display only unit displaying the data from all the detector units. In this configuration, six interface units would be required, two for each detector unit showing blister and nerve modes. The display only units are connected to the detector units by fiber optic cable.

Numeral 3 represents a unit which might be located in Damage Control Central (DCC) which has the capability to both display the information from the detector units and control the operation of the detectors 1.

It should be understood that the system of FIG. 1 can be constructed of any number of detectors 1 and display units 2 without departing from the scope of the invention. The interface is the same in all applications.

Figure 2:
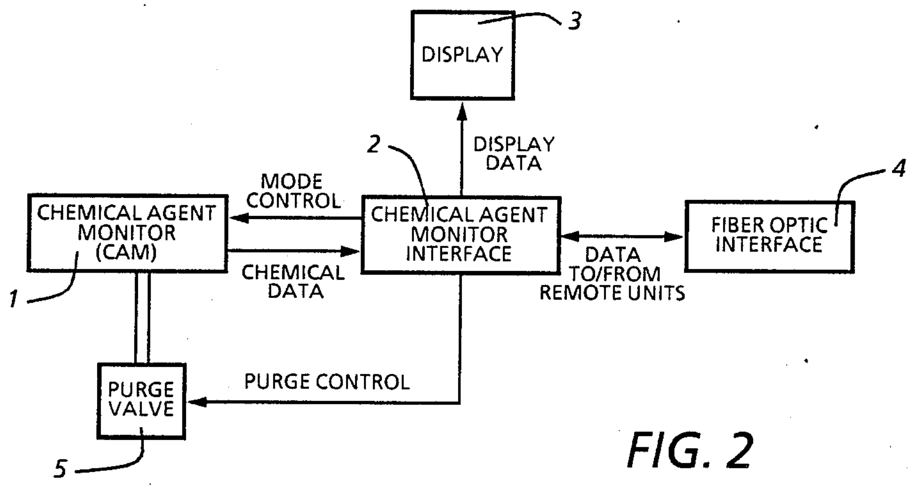
FIG. 2 is a block diagram showing the basic elements of a system using the disclosed interface.

Turning now to FIG. 2, five basic elements comprising the system within which the interface operates may be more clearly understood.

Therein numeral 1 is a chemical agent monitor (CAM)—off-the-shelf detector that senses airborne chemical agents. Power requirement: +6 VDC @1 A through rear connector pin K. Rear connector pin E electrically connected to signal ground.

Numeral 2 is the preferred embodiment based on a 87498-bit microprocessor microcircuit with on-board 2 kilobyte Erasable Programmable Read Only Memory (EPROM) which solely contains the software written in MCS-48 Assembly Language. The microprocessor interprets data from the chemical detector and acts upon it to alert personnel of possible chemical hazards. (The choice of the microprocessor is arbitrary and any microprocessor may be used, noting that the software would be written in the microprocessor's native language.) Power requirement: +5 VDC @1 A.

Numeral 3 is an off-the-shelf display medium used to inform personnel of system operation and chemical hazards. Various displays are known to those skilled in the art and the display medium is not claimed as part of the invention. Power requirement: +12 VDC @1 A, +5 VDC @1 A for the plasma display used in the embodiment built and tested.

Numeral 4 is fiber optic interface—off-the-shelf module to convert electrical RS232 C signals to light. The light beam travels across 500 feet of lightweight EMI proof fiber optic cable to an identical module which converts the light beam back into electrical signals at another interface card. Power requirement: +12 VDC @300 mA, −12 VDC @100 mA for the litton Model Number EO3675 used in the system tested.

The purge valve 5 is an off-the-shelf explosion-proof, three-way, solenoid valve used to direct the CAM to intake samples from the ambient air or from a carbon filter.

All interconnections between the interfaces displays and CAMs requiring optical carriers use standard fiber optic cables and connectors. The test unit used D02-048C-A3 FB/9002 Fiber Tactical Fiber Optic Cable and Model906 SMA Fiber Optic connectors available commerically from Optical Cable Corporation, 870 Harrison Ave., Salem VA 24153.

Figure 5:
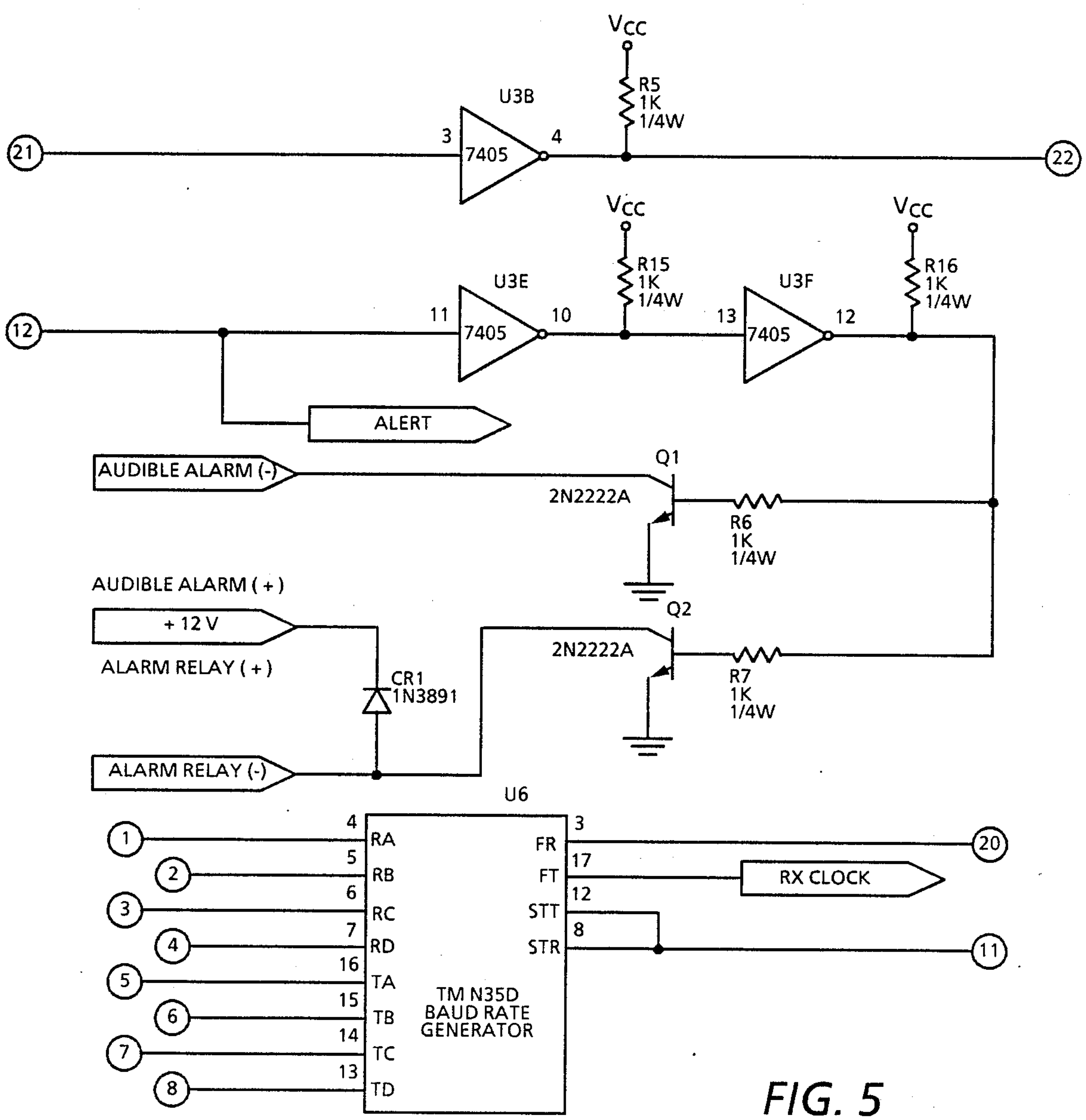
Figure 3:
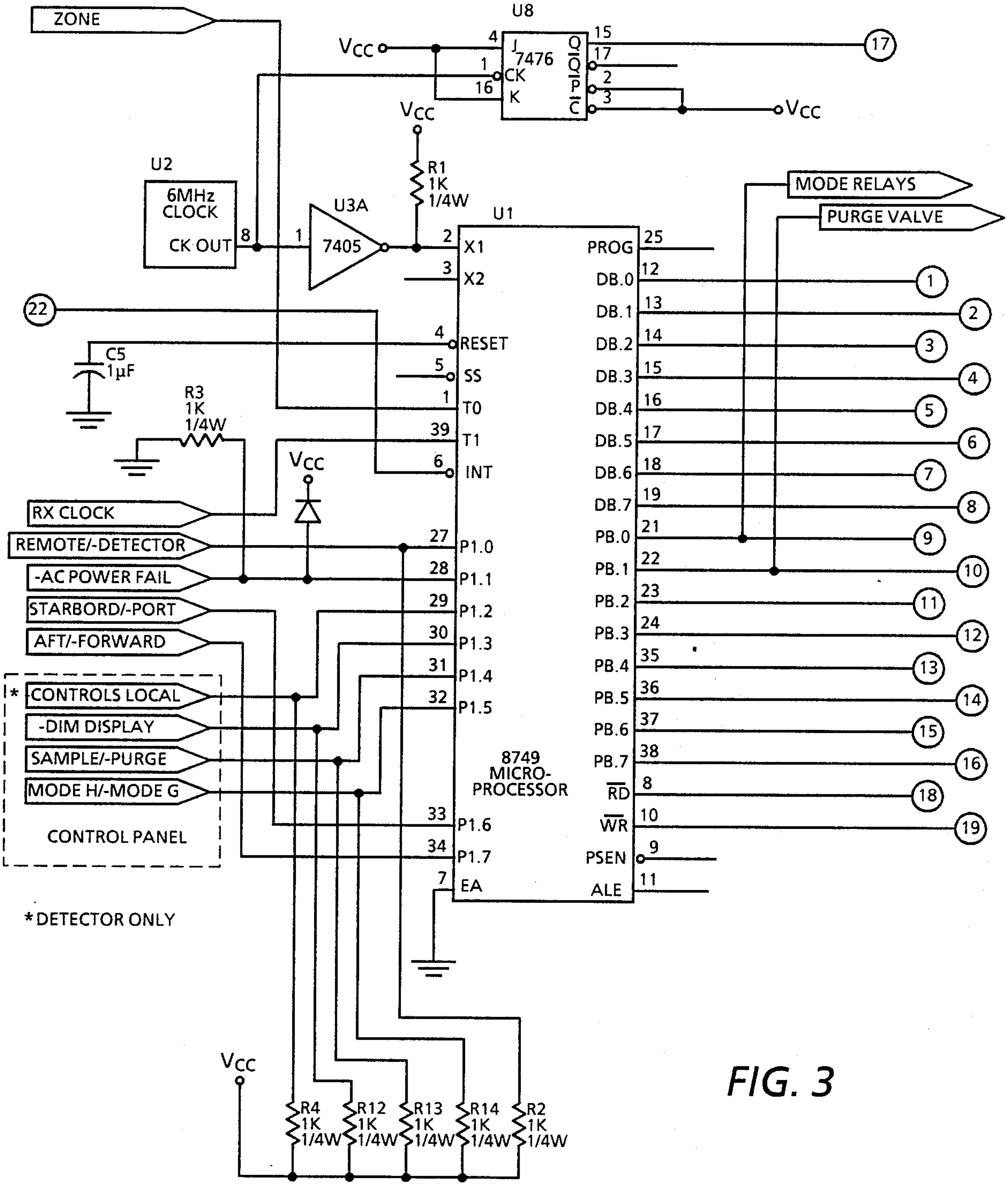
Figure 4:
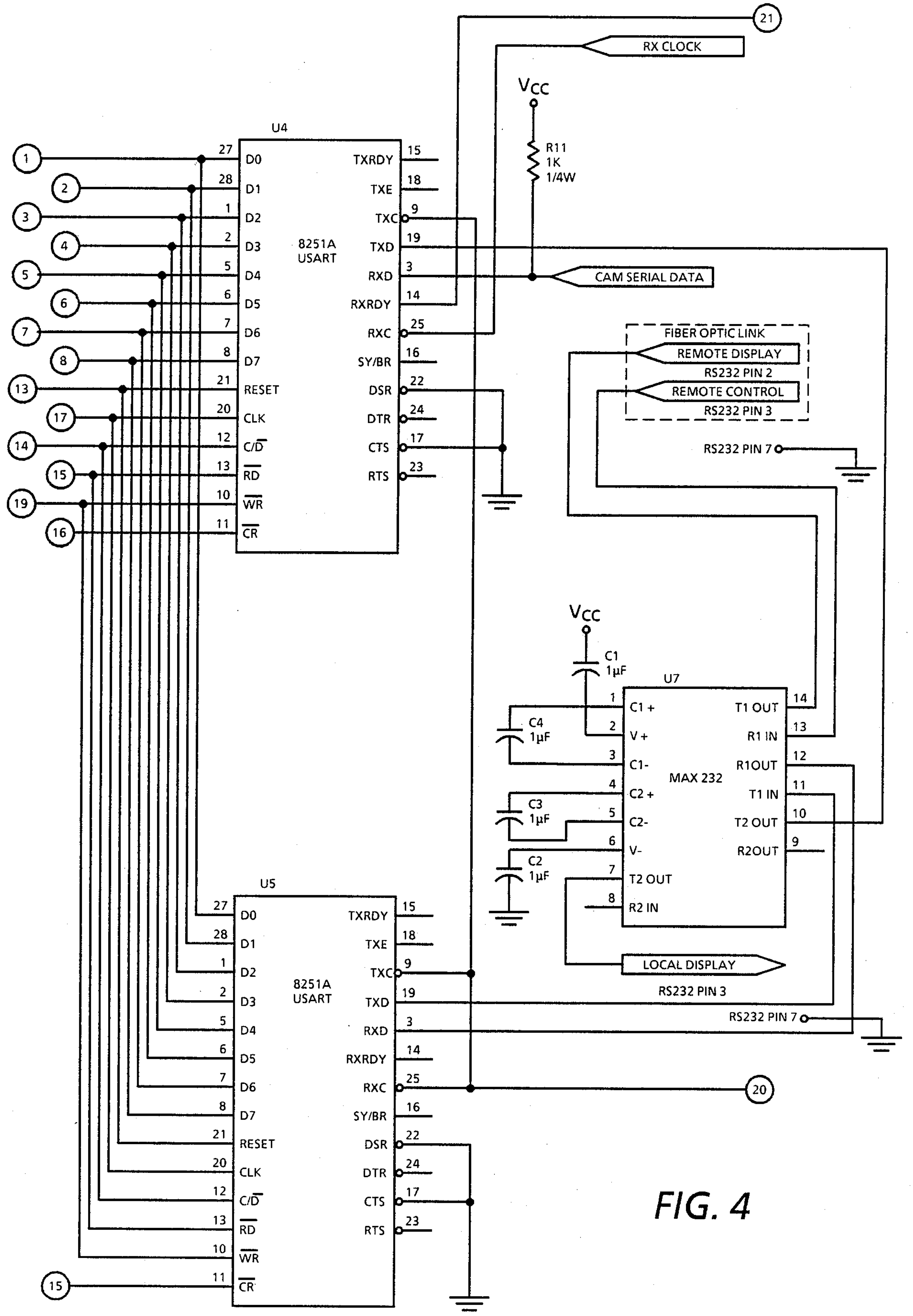
Figure 6:
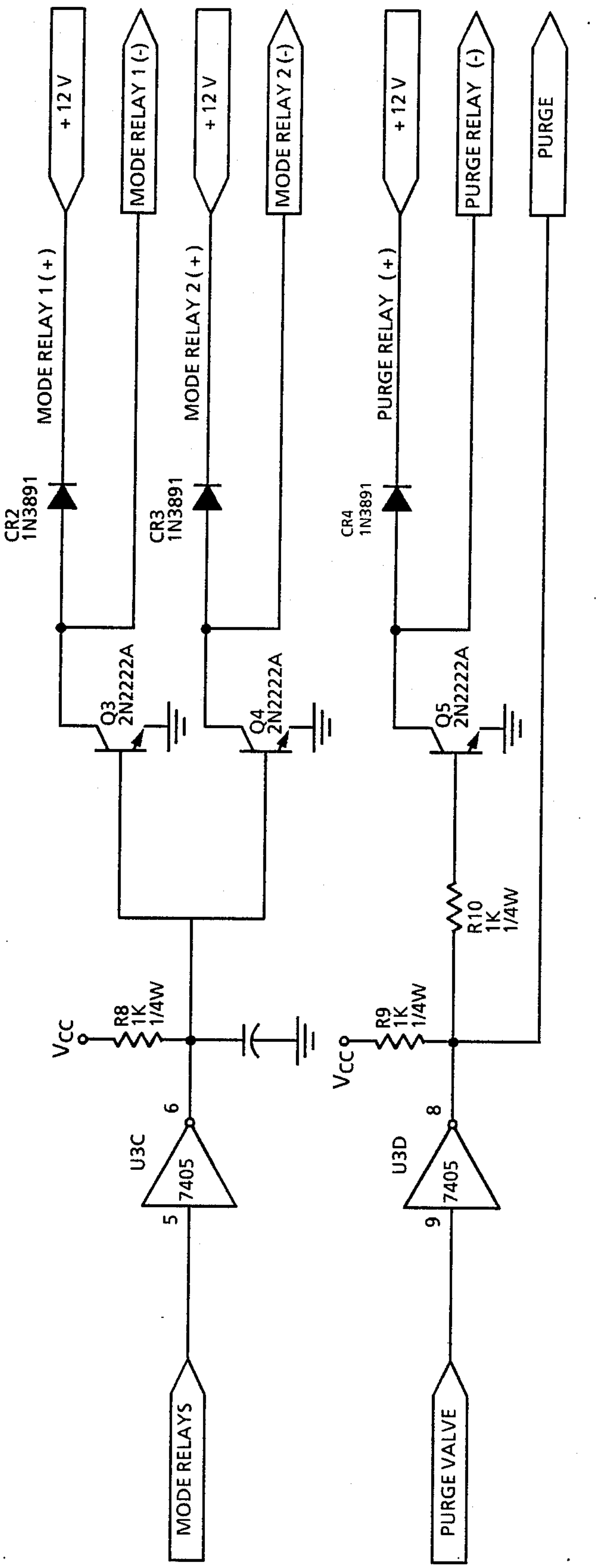

Turning now to FIGS. 3 through 6, a schematic of the present invention as actually built and constructed in modular form is illustrated. FIGS. 4, 5, and 6 are continuations of FIG. 3 and the four Figures should be read together.

The CAM interface circuit of FIG. 3 through 6 is designed to mate with a motherboard which defines whether the interface is electrically connected to a chemical detector or is remote controlled or only a remote display device by reading key signals on the motherboard. The motherboard is of a type known to those skilled in the art, may be constructed in various ways without departing from the scope of the interface and is not illustrated nor claimed.

A general overview noting key elements of the interface card with reference to the schematic diagram of FIGS. 3 through 6 follows:

REAL-TIME STATUS INFORMATION

The Remote/Detector switch function controlled by U1 pin 27 senses if a CAM is electrically connected to the interface. Pin S of the SAM's rear connector is electrically connected to U1 pin 27. If U1 pin 27 is low, then a CAM is attached to the interface and the "Detector"(ROLE 2) portion of the interface software is run. Otherwise, the "Remote" portion of the software is run. The interface can function as ROLE 1 if it transmits a remote control byte or ROLE 3 if it merely displays information. ROLE 3 is established when U1 pin 27 is high and the control panel switches and U7 pin 14 are electrically disconnected from the interface.

U1 pin 28 senses if the AC power supply fails in a system with battery backup. If U1 pin 28 goes low, then the ROLE 2 software displays "DETECTOR ON DC". Otherwise, the software displays "DETECTOR ON AC". Likewise, a remote unit in ROLE 'uses this pin to sense remote power status and would send it to the detector unit in the remote control byte. The display would read "CONTROLS ON DC" or "CONTROLS ON AC", respectively.

Three signals determine the sampling source message and are derived from jumpers on the motherboard. The signals are on U1 pins 1, 33 and 34. The following truth table describes the signal to message relationship. (A logic 1 represents active high, while a logic 0 represents an active low and X represents don't care.):

| PIN 1 | PIN 33 | PIN 34 | MESSAGE |
|---|---|---|---|
| 0 | 0 | 0 | PORT SIDE - FORWARD |
| 0 | 0 | 1 | PORT SIDE - AFT |
| 0 | 1 | 0 | STARBOARD SIDE - FORWARD |
| 0 | 1 | 1 | STARBOARD SIDE - AFT |
| 1 | X | X | MONITORED ZONE |

The mode switch is electrically connected between U1 pin 32 and signal ground. If the chemical detector has completed its "self-test", or a chemical hazard alarm condition does not exist, or a low reactant ion peak (RIP) signal is not pending, then the switch will function as described below, otherwise the switch is inhibited.

If the switch is open then R14 pulls U1 pin 32 high and the interface will set the ion mobility spectrometry (IMS) cell to sample for blister agents in H mode. Closing the switch creates an active low on U1 pin 32, thus overriding the pullup voltage of R14 (used to prevent a transient from simulating the active signal) causing the interface to set the IMS cell to sample for nerve agents in G mode.

The interface uses U1 pin 21, located at port 2 address O1H, as means to switch Q3 and Q4, both 2N2222A transistors, through U3C, a 7405 open collector inverter, to change between G and H modes of operation. The output of U1 pin 21 will go low to feed U3 pin 5 to activate Q3 and Q4 which energizes mode relays 1 and 2 for H mode. The output of U1 pin 21 will go high to feed U3 pin 5 to deactivate Q3 and Q4 which de-energizes mode relays 1 and 2 for G mode. The mode relay contacts carry 1000 volts used in reverse the polarity of the electric field within the CAM's IMS cell, thus changing modes.

The purge control switch is electrically connected between U1 pin 31 and signal ground. If the CAM has completed its "SELF-TEST", or a chemical concentration at the automatic purge threshold does not exist, or a low reactant ion peak (RIP) is not pending, then the switch will function as described below, otherwise the switch is inhibited.

If the switch is open then R13 pulls U1 pin 31 high and the interface will sample ambient air. When sampling, if the IMS cell becomes saturated to the preprogrammed concentration bar threshold, then the interface will automatically purge until the cell clears of agent. Closing the switch creates an active low on U1 pin 31, thus overriding the pullup voltage of R13 (used to prevent a transient from simulating the active signal) causing the interface to purge indefinitely.

The purge valve is operated by U1's port 2 address O2H. U1 pin 22 feeds U3D, a 7405 open collector inverter, which in turn activates Q5, a 2N2222A transistor. Q5 energizes a purge relay which energizes the purge solenoid valve. When U1 pin 22 goes low to feed U3 pin 9, U3 pin 8 in turn goes high to drive Q5 which energizes the purge valve causing the detector to draw in clean air via a carbon filter. When U1 pin 22 goes high to feed U3 pin 9, U3 pin 8 in turn goes low to turn off Q5 which de-energizes the purge valve causing the detector to sample ambient air.

The dim control switch is electrically connected between U1 pin 30 and signal ground. If this switch closed, then U1 pin 30 is pulled active low, thus overriding the pullup voltage of R12 (used to prevent a transient from simulating the active signal). The program then sends dimming codes to the electrically connected plasma display for as long as the switch is closed.

The local control switch is electrically connected between U1 pin 29 and signal ground. Only ROLE 2 has this switch connected. If this switch is closed, then U1 pin 29 is pulled active low, thus overriding the pullup voltage of R4 (used to prevent a transient from simulating the active signal). The program then assumes that control is LOCAL, meaning that the control panel of the interface electrically connected to the CAM will be used to operate the chemical detection system. The display will read "CONTROLS AT THE DETECTOR". If this switch is open, then U1 pin 29 is pulled active high by R4 and the interface will expect to receive a remote control byte from the fiber optic link.

The alarm switch is electrically connected between AUDIBLE ALARM (+) and the audible alarm positive input. If this switch, which supplies power, is closed, then the local audible alarm will sound in a chemical alert condition. If this switch is open, then the audible alarm is silenced in a chemical alert situation because power has been disconnected from it.

A CAM uses an 8-bit 1802 microprocessor to process and transmit chemical detection data. The detector, based on an ion mobility spectrometry (IMS) cell, displays a qualitative chemical concentration through a series of one to eight bars, G or H, depending on mode of operation, a low reactant ion peak (RIP) symbol and low battery data on its liquid crystal display. Additionally, the detector outputs this same information in a four byte 300 Baud data burst at a TTL compatible voltage. The data burst also contains an agent identification code and a quantitative dosage value. The data burst occurs approximately once every second on pin L of the CAMs rear connector. There is no time gap between each byte in the burst. The interface depends on these time differentials to synchronize the corresponding bytes. These four bytes are defined as follows: (All signals are active high.)

Byte 1: LCD Display Data:
- Bits 0–3: Binary Coded Decimal (BCD) representation of number of concentration bars
- Bit 4: Low Battery
- Bit 5: Low Reactant Ion Peak (RIP)
- Bit 6: WAIT
- Bit 7: Mode Indication: 0=H mode/ 1=G mode Byte 2: Least Significant Byte of Dosage Value
Byte 3: Most Significant Byte of Dosage Value
Byte 4: Agent Identification Code:

| Code | Agent ID |
|---|---|
| 01 | GA |
| 02 | GB |
| 03 | GD |
| 04 | VX |
| 07 | HS |
| 08 | HN |

The interface has been programmed to accept all the above bytes and to interpret them accordingly. Two or more bars constitute a chemical alert. Six or more bars or a low reactant ion peak causes an automatic purge.

A detailed "walk-thru" of an interface operating as a stand alone Detector with Local Control and Display assuming ROLE 2 will best explain the function of the interface circuitry since all facets of the interface will be utilized.

On power up, the interface's microprocessor, U1, is reset by the discharge of C5 between U1 pin 4 and ground.

Next, the Baud Rate Clock, U6, a TM1135D, is assigned its baud rates by writing the data via the data bus (U1 pins 12–19) to U1's port 2 device address 04H and asserting the WRITE signal on U1 pin 10. The fiber optic link and plasma displays are programmed for 9600 Baud and the CAM serial data link is programmed for 300 Baud.

Then, the microprocessor, U1, initializes B251A USARTS (Universal Serial Asynchronous Receiver/-Transmitter) U4 and U5 to communicate with the electrically connected chemical detector and fiber optic data link, respectively. U4 is also used to communicate with the local electrically connected host plasma display. The interface is configured such that data flowing to USART, U5, can be simultaneously transferred to U4 and the plasma display by selecting the proper bit pattern on port 2 of U1 (U1 pins 21–24, 35–38) and outputting the data on the data bus, U1 pins 12 through 19 so as to save program execution time and program memory. All devices are addressed through the microprocessor's input/output (I/O) port 2. Device selection is completely under software control.

The communications links are initialized by writing to U1 Port 2 address 10H which ties to the reset input pin 21 of USARTS U4 and U5. U1 then addresses the command ports of U4 and U5 at 6FH and AFH on U1 port 2, respectively, to program each USART to use 1 start bit, 8 data bits, 1 stop bit, and no parity as the communication parameters. The USART program data is placed on the data bus, U1 pins 12 through 19, and the WRITE signal on U1 pin 10 is asserted. Refer to the software listing in the appendix for further detail.

After the communication links are initialized, the interface tests for the presence of a CAM electrically connected to the interface by polling U1 pin 27. If the instant signal is active low, thus overriding the pullup voltage of R2 (used to prevent a transient from simulating the active signal), then a CAM is attached and ROLE 2 "DETECTOR" will be assumed. If the instant signal were high, then ROLE 1 could be assumed. If control settings were not to be transmitted across the link, the ROLE 3 could be assumed.

The local plasma display is then sent a maximum brightness code and paints the banner message.

ROLE 2 will then enable U1 to recognize interrupts from the CAM on U1 pin 6. An interrupt signal occurs whenever the CAM sends a data burst byte to USART U4 pin 3. U4 pin 14 will go active high, indicating that it has received a data byte, enter open collector inverter, U3 pin 3, and feed from pin 4 as an active low to U1 pin 6. The interface would then attempt to read the four consecutive data bytes emanating from the chemical detector.

The interface then displays "SELF-TEST" and sets the purge valve for purging action, the mode relays for H mode (blister agents), silences the alarms and polls the display DIM switch until an interrupt occurs. If the DIM switch, electrically connected between U1 pin 30 and ground, is closed, then the software will send dimming codes to the plasma display until the DIM switch is open again.

The interface will then poll the LOCAL/REMOTE Control switch connected between U1 pin 29 and ground. Only ROLE 2 has this switch electrically connected. If the switch is closed, then U1 pin 29 is pulled active low, thus overriding the pullup voltage of R4 (used to prevent a transient from simulating the active signal). The program then assumes that control is LOCAL, meaning that the switches electrically connected to the interface, which is electrically connected to the chemical detector, will control the chemical monitoring system. This means that instead of reading the remote control byte received in USART, U5, from the fiber optic link as in REMOTE operation, the control settings will come from Port 1, pins 30 through 32, of the microprocessor, U1. For the sake of explaining the total interface, the assumption will be made that the switch is set to LOCAL control. An interface in ROLE 1 acquires the control settings from U1's port 1 in the same manner as the interface set to LOCAL control. The bit pattern in the remote control byte is interpreted exactly the same as the bit pattern on U1 port 1. The only exception is that if bit 3 of the remote control byte is active low, then remote controls are considered off line while the remote site dims its display. Refer to the schematic FIG. 3 for associated bit assignments on U1 port 1. Port 1 pins are lablelled P1.0 through P1.7.

The state of the CAM bar data controls what the microprocessor will do with the control setting information. The microprocessor's decisions are based solely on the resultant bar display data under software control. The interface is programmed to signal alarms if a threshold of two or more bars are indicated by the chemical detector. If a threshold of six or more bars or a low reactant ion peak (RIP) reference signal is detected, then the interface will energize the Purge Solenoid Valve until one or no bars are indicated and the low RIP signal is not asserted. A low RIP signal represents the presence of an agent whose parameters do not match up with the CAM's built-in agent library. The interface displays this signal as "LO RIP".

A discussion of the events during a chemical hazard using ROLE 2 follows:

a. The interface is constantly updating the display data by writing to address OFH which opens a channel to the plasma display and the RS232 fiber optic link simultaneously.

b. The CAM will interrupt the display update process and will cause the interface to read the four data bytes described previously from U4 and U1 port 2 address 04FH. Referring to the schematic, port 2 is shown as P2.0 through P2.7. U4 signals U1 via U4 pin 14 which in turn passes through U3B to U1 pin 6. U1, the microprocessor, then jumps to the interrupt service routine, in software, to read U4 as the CAM bytes arrive. The bytes are placed on the data bus, U1 pins 12 through 19, when the READ signal is asserted on U1 pin 8 and U4 is selected on U1 port 2. U1 waits a predetermined interval between bytes. If the next consecutive byte fails to arrive inside that interval, then U1 begins waiting for the first byte again, and then proceeds to collect all four bytes. Once all four bytes are collected, U1 returns to updating the display information.

c. When an alarm condition exists, the plasma display may appear as follows:

| |
|---|
| * Chemical Monitor Version 1.00 Detector |
| ALERT DETECTED AGENT: GA DOSE:0206 |
| [1][2][3][4][5][6] |
| G Mode: NERVE |
| PURGE STARBOARD SIDE-AFT |
| CONTROLS ON AC DETECTOR ON AC |

which indicates that the interface is running software REV 1.00 and that the CAM has received a very strong dose of nerve agent on the starboard side-aft zone of a Naval vessel. The interface acknowledges that a purge operation is taking place and that the CAM interface is being controlled from the remote site. The interface also indicates that the AC power is within tolerances at both sites.

d. The interface will activate the Purge Solenoid Valve (not shown) by driving a logic 0 on U1 port 2 bit 1.

e. The interface transmits an "alarm-on" character 1CH across the fiber optic link.

f. The interface sounds the audible alarm by sending a logic 0 on port 2 of U1 pin 24 to U3 pin 11 which is inverted at U3 pin 10. U3 pin 10 feeds this signal to U3 pin 13 thus providing more drive capability. Thus, U3 pin 12 drives 2N2222A transistors, Q1 and Q2, to directly drive a sonalert buzzer (not shown) and to energize a relay which is used to activate any existing alarm system.

g. Only the DIM switch is enabled.

The following takes place when there is no alarm condition:

a. When no alarm condition exists, the plasma display may appear as follows:

| |
|---|
| * Chemical Monitor Version 1.00 Detector |
| H Mode: BLISTER |
| SAMPLE STARBOARD SIDE-AFT |
| CONTROLS AT THE DETECTOR ON DC |

which indicates that the interface is running software REV 1.00. The interface acknowledges that it is sampling the starboard side-aft zone of a ship for blister gas and that the CAM interface is being locally controlled at the detector. The interface also indicates that the detector is running on battery backup.

b. The interface will deactivate the Purge Solenoid Valve by asserting a logic 1 on U1 port 2 bit 1.

c. The interface transmits an "alarm-off" character 1DH across the fiber optic link.

d. The interface silences the audible alarm by sending a logic 1 on port 2 of U1 pin 24 to U3 pin 11 which is inverted at U3 pin 10. U3 pin 10 feeds this signal to U3 pin 13 and U3 pin 12 drives 2N2222A transistors, Q1 and Q2, to directly silence the local alarm and de-energize the relay which is used to activate any existing alarm system.

e. All the control switches are enabled.

Components for the embodiment illustrated are available both commercially and through the military supply system.

For instance, the plasma display, model APD-240M026A-1, is available from Data Electronics, P.O. Box 609, Columbus, NB 68601. The microcircuit components U3 and U8 are available from National Semiconductor, 2900 Semiconductor Drive, Mail Stop 23-200, Santa Clara, CA 95051. The microcircuits U1, U4 and U5 are available from Intel Corp, Dept. G, 3065 Bowers Ave., Santa Clara, CA 95051. U2 is available from CTS Corp., Knight Div., 400 E. Reimann Ave., Sandwich, IL 60548. U7 is available from Maxim Integrated Products, Inc., 510 N. Pastora Ave., Sunnyvale, CA 94086. U6 is available from Oscillatek, 620 N. Lindenwood Dr., Olathe, KS 66062. The solenoid valve, an Airmatic model V30704-HH-12VDC Orif 1/8-3/32, is available from Sharp Controls, PO Box 668408, Charlotte, NC 28266. The fiber optic module, Model EO3675, is available from Litton, Fiber Optics Division, 1213 North Main Street, Blacksburg, VA 24060.

All other electrical components are readily available from multiple commercial sources known to those skilled in the electronics art.

The present invention uses solid state circuitry which is easily constructed through printed circuit techniques to mate with a second mother card module.

Turning now to FIG. 7, a block diagram of the modifications made to the CAM to allow the interface to control the purging of the CAM is illustrated for further understanding. The modification is not shown in detail as it is considered within the ordinary skill of those skilled in the art and the mechanical purging circuit of FIG. 7 is not claimed as part of the interface. Therein the standard military issue CAM 51 is fitted with an adapter 52 which connects a purging tube to the purging inlet of CAM 51 to purging valve 53. Purging valve 53 will be controlled by the purge valve circuit shown in the schematic of FIG. 6. The purge valve is then connected to the filter 54 which is a part of an unmodified CAM.

FIG. 8 is a flow chart for the chemical agent monitor interface software. The actual software format will vary with the type microprocessor employed in the interface. In the embodiment built and tested, the software was written in MCS-48 assembly language to complement the 8749 8-bit microprocessor chosen and illustrated in FIG. 3. It is considered within the ordinary skill of one skilled in the art to develop the appropriate software from the flow chart of FIG. 8 hereinbelow described.

In the main program begin with block 1 then go to 2.

2. The processor programs the USARTs and the Baud rate clock. Go to 3.

3. The processor tests if the CAM is connected. If the CAM is connected, go to 4, else to go 7.

4. Display the DETECTOR message and assume ROLE 2. Go to 5.

5. Test if the CAM self-test is complete. If the test is complete, go to 6, else go to 16.

6. Test for a Chemical Alert Condition. If ALERT, then go to 23, else go to 22.

7. Display REMOTE message and assume ROLE 1 or ROLE 2. Go to 8.

8. Send the remote power status and control switch settings across the fiber optic link. Go to 9.

9. If the dim control switch is on, go to 14, else go to 10.

10. If ALERT, then go to 15, else go to 11.

11. Silence alarms. Go to 12.

12. Test for synchronization with ROLE 2 interface across link. If in sync, then go to 13, else go to 8.

13. Echo the characters, received from the link, on the display. Loop back to 8.

14. Send Dim codes to display and go to 10.

15. Turn on alarms and go to 12.

16. Display self-test message. Go to 17.

17. Purge CAM cell. Go to 18.

18. If Dim control switch on, then go to 19, else go to 5.

19. Send dim codes to display and go to 5.

20. Set the CAM to G or H mode, depending on Mode control switch. Go to 21.

21. Set the CAM purge valve to sample or purge, depending on Mode control switch. Go to 22.

22. Silence alarms and read control switch settings from local panel if Local switch set or from ROLE 1 interface across fiber optic link. Go to 6.

23. Sound alarm. Go to 24.

24. Display ALERT message and loop back to 6.

FIG. 9 is a flow chart of the software controlling the CAM interrupt service routine. Therein the program called when the CAM sends out data bytes begins with block 1 then goes to 2.

2. Use another set of registers separate from the main program. Go to 3.

3. Get byte 1 of 4.

4. If time between bytes too long, timeout and go to 3 again. Else, go to 5.

5. Get byte 2 of 4. Go to 6.

6. If time between bytes too long, timeout and go to 3 again. Else, go to 7.

7. Get byte 3 of 4. Go to 8.

8. If time between bytes too long, timeout and go to 3 again. Else, go to 9.

9. Get byte 4 of 4. Go to 10.

10. Restore original set of registers used by main program.

11. Subroutine ends here. Return to main program.

Many modifications and variations of the present invention are possible. Thus, it can be seen that this invention, which may be practiced otherwise than is specifically described, accomplishes at least all of its stated objectives.

What is claimed is:

1. A chemical agent monitor control interface system comprising:

a chemical agent monitor;

means for inputting serial data from said chemical agent monitor;

means for outputting electrical control signals to said chemical agent monitor;

means for fiber optically linking control and status signals within the system;

a purge valve connected to said chemical agent monitor for purging said chemical agent monitor whereby said monitor can be purged remotely by manual or automatic control;

means for processing to provide programmed control of said chemical agent monitor and said purge valve; and means for outputting display data from said means for processing whereby operators can discern the system status and any chemical hazard detected by said chemical agent monitor.

2. A system according to claim 1 further defined by an audio alarm whereby an alarm sounds when a chemical hazard is detected by the system.

3. A system according to claim 1 further defined by switching means for selecting between local and remote control of the chemical agent monitor.

4. A system according to claim 1 constructed with integrated circuits.

5. A control interface system for a chemical agent monitor and advisory system comprising:

means for inputting serial data from a chemical agent monitor;

means for processing the data received from said means for inputting;

means for outputting human-readable display data from said means for processing;

means for displaying continuous chemical and system status received from said means for processing at a plurality of locations in human readable form;

means for sounding an audible alarm when the data inputted from said means for inputting indicates a chemical agent is present;

a purge value activated by means for processing whereby the chemical agent monitor inputting to said means for inputting can be remotely purged, manually or automatically, through software; and means for manual control whereby the chemical agent monitor can be operated manually from a remote site.

* * * * *